(12) United States Patent
Yucesan et al.

(10) Patent No.: US 7,675,714 B1
(45) Date of Patent: Mar. 9, 2010

(54) STIFFENED VOICE COIL FOR REDUCTION OF TRACKING ERRORS IN A DISK DRIVE

(75) Inventors: Guven Yucesan, Shrewsbury, MA (US); Larry E. Wittig, Lexington, MA (US); Roy J. MacKinnon, Shrewsbury, MA (US); Daniel J. Dorval, Hubbardston, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 1400 days.

(21) Appl. No.: 11/077,295

(22) Filed: Mar. 9, 2005

Related U.S. Application Data

(60) Provisional application No. 60/551,641, filed on Mar. 9, 2004.

(51) Int. Cl.
*G11B 5/55* (2006.01)
(52) U.S. Cl. .................................................. 360/265.8
(58) Field of Classification Search .................. 360/265, 360/265.8
See application file for complete search history.

(56) References Cited

U.S. PATENT DOCUMENTS

| 5,130,871 | A | 7/1992 | Whitmore |
| 5,557,152 | A | 9/1996 | Gauthier |
| 5,790,348 | A | 8/1998 | Alfred et al. |
| 6,252,746 | B1 * | 6/2001 | Cho ........................ 360/265.8 |
| 6,512,658 | B1 * | 1/2003 | Jierapipatanakul et al. ........................ 360/264.7 |
| 6,847,506 | B1 * | 1/2005 | Lin et al. .................. 360/265.8 |
| 6,937,444 | B1 * | 8/2005 | Oveyssi ................... 360/265.8 |
| 6,980,401 | B1 * | 12/2005 | Narayanan et al. ....... 360/265.8 |
| 2002/0167763 | A1 * | 11/2002 | Macpherson et al. ..... 360/265.8 |
| 2003/0081355 | A1 * | 5/2003 | Arisaka et al. ............. 360/265 |
| 2004/0169961 | A1 * | 9/2004 | Lin et al. .................... 360/265 |

FOREIGN PATENT DOCUMENTS

WO  2001/26098 A1  4/2001

\* cited by examiner

*Primary Examiner*—David D Davis
(74) *Attorney, Agent, or Firm*—Shumaker & Sieffert, P.A.

(57) ABSTRACT

The present invention is a system for stiffening a voice coil of a magnetic disk drive. One embodiment of the present invention are stressed skins that interconnect with an upper portion and a lower portion of the voice coil such that they are flush with the upper and lower surfaces of the voice coil. The stressed skins are adhered or otherwise interconnected to the voice coil thus allowing for bending, twisting, torsional, and various other loads that generate vibrations that affect the head of an actuator assembly to be dampened. One embodiment of the present invention includes two stressed skins interconnected to a voice coil constructed of carbon composite wherein the space therebetween is filled with a foam to provide additional stiffness and damping.

27 Claims, 13 Drawing Sheets

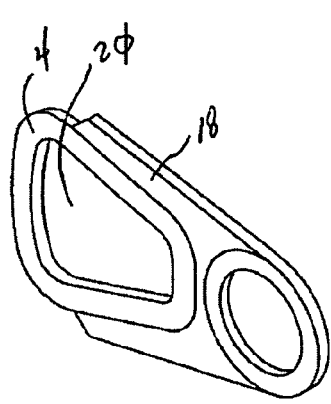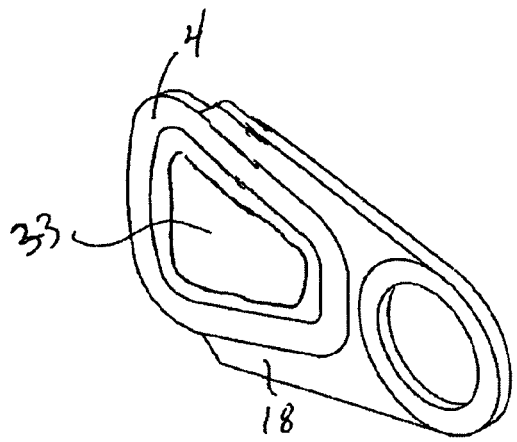
*Fig. 6A*  *Fig. 6B*
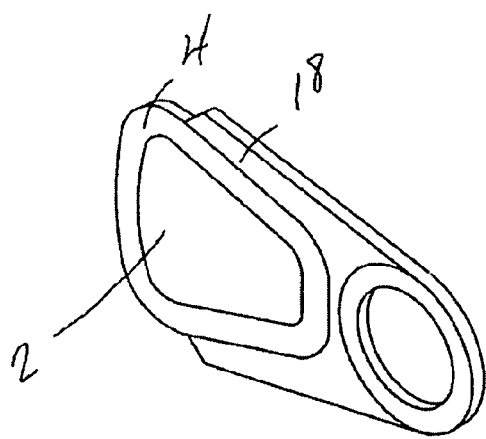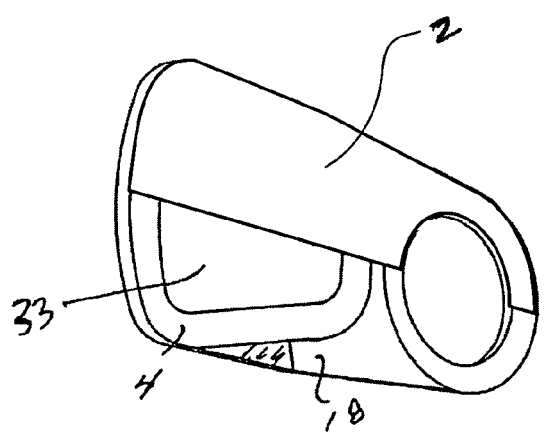
*Fig. 6D*  *Fig. 6C*

STIFFENED VOICE COIL FOR REDUCTION OF TRACKING ERRORS IN A DISK DRIVE

CROSS-REFERENCE TO RELATED APPLICATIONS

This application claims the benefit of U.S. Provisional Patent Application Ser. No. 60/551,641, filed Mar. 9, 2004, which is incorporated by reference in its entirety herein.

FIELD

The present invention relates to disk drives.

BACKGROUND

Hard disk drives store information on magnetic disks. Typically, the information is transferred to and from concentric tracks of the disk that are divided into servo sectors and data sectors. Information is written to or read from the disk by a transducer, or head, that is mounted on an actuator arm that positions the transducer over the disk in a predetermined location. Accordingly, movement of the actuator arm allows the transducer to access the different tracks of the disk. The disk is rotated by a spindle motor at a high speed, allowing the transducer to access different sectors within each track on the disk.

A voice coil motor (VCM), in combination with a servo control system, is usually employed to position the actuator arm. The servo control system generally performs the function of seek control and track following. The seek function is initiated when a command is issued to read data from or write data to a target track on the disk. Once the transducer has been positioned sufficiently close to the target track by the seek function of the servo control system, the track following function of the control system maintains the transducer on the target track until the desired data transfer is completed.

Typically, the transducer will oscillate about the center line of the target track for a period of time following the transition of the servo control system from the seek mode to the track following mode. These off-track displacements, or post-seek oscillations, are due, at least in part, to mechanical vibrations generated by the components of the disk drive during the seek and/or tracking operation. In addition, while in the track following mode, adjustments to the position of the transducer with respect to the center line of the target track are often required due to mechanical vibrations. Such adjustments are required to correct drift in the position of the transducer relative to the target track. The precise control of the position of the transducer relative to a target track has become increasingly important as track densities (or tracks per radial inch—TPI) in disk drives have increased. More specifically, the number of tracks included on a disk, i.e., the greater the TPI, translates to higher data storage capability. However, the increased number of tracks means that there is a more stringent requirement that the transducer stay on track for both reading and writing purposes as the separation distance between adjacent tracks decreases.

A measure of how far the transducer is off target is termed "Track Misregistration" (TMR). It can be measured in distance (e.g. microns) or as a percentage of track pitch. TMR is also referred to as off track or track following errors.

Disk drives generally utilize a voice coil that interacts with a pair of permanent magnets. Generally, the coil is secured by two prongs that form the yoke of the actuator assembly. Electric current in the voice coil interacts with the magnetic field generated by the permanent magnets, thus allowing the head of the actuator assembly to be selectively positioned by variance of the current.

The actuator assembly, including the voice coil and yoke, actuator arm, suspension and slider, generates vibrational loads that impair the ability of the actuator assembly to position and maintain the transducer over a desired track. To account for vibrational loads, during the design phase, the amount of vibration from the assembled components are assigned a budget, that must not exceed a predetermined level of generated vibration thus minimizing TMR and post seek oscillation errors. These budgets are based upon vibrations originating from a number of sources and take on various forms including, but not limited to, electrical noise torque, whirl, arm mode, drum mode, high frequency turbulence, disk vibration, aerodynamic torque, and external vibration or seek settle. More specifically, many of the vibrational loads are generated by the different modes of vibrational motion generated by the components of the actuator assembly. Minute vibrational loads that emanate from the aerodynamic loading of the disk and/or actuator moving through the air inside the disk drive housing may also affect TMR and post seek oscillations. Thus, it is important for designers of disk drives to reduce the individual sources of vibrational loads that influence positioning of the transducer to produce a disk drive with lower vibrational loading such that the servo control system may better compensate for TMR and post seek oscillations.

In addition to the post seek oscillations generated by the components of the actuator assembly, post seek oscillations are also caused by the acceleration and deceleration of actuator arm movement as it moves from one track to an intended track. Other sources of post seek oscillation will be apparent to one skilled in the art, such as those from the interaction between various components such as the bearing and the actuator when the actuator slows or stops the flex circuit and the actuator, the rotation of the disk, the interaction of the voice coil motor with the driver, etc.

The negative effects of TMR and post seek oscillations are most easily described by a brief discussion of track pitch. The distance between two concentric tracks of a disk is known as track pitch, which decreases as TPI increases. For example, a disk with 100,000 TPI has generally a track pitch budget of 0.254 microns, (10 millionths of an inch), wherein a disk with a 150,000 TPI has a track pitch of about 0.17 microns (approximately 7 millionths of an inch). As described above, each vibration-generating component of a disk drive has a budget that contributes to the maximum allowable TMR that are correctable by the servo control system. That is, vibrational induced oscillations of the transducer must be maintained at or below a level where the servo controller can effectively counteract the movement and control the position of the transducer. This level is predetermined in the design of a disk drive. Returning now to the example in which a 100,000 TPI disk drive was described, vibrations generated by the voice coil may cause transducer displacements of about plus or minus 0.32 microns (1.25 millionths of an inch) from the intended track centerline. The servo controller of the actuator arm is then tasked to reduce this movement generated by the coil. For this example, it is assumed that the servo controller is capable of reducing the oscillations to 0.050 micron, or plus or minus 0.025 micron off its intended path. Thus, the vibrations generated by the voice coil take up 10% of the track pitch based off-track budget of the servo control system (0.025 micron÷0.25 microns). When the TPI of the disk is increased to 150,000, and the same servo controller is used (which reduces the effect of the oscillations down to plus and minus 0.025 micron), vibrations generated by the voice coil now equal about 15% of the total budget (0.25 micron÷1.7 microns). This translates to perhaps a 5% increase of budget consumption due to vibrations generated by the voice coil when the TPI of the disk drive is increased fifty percent. If the goal of the designers is to maintain the TMR budget generated by the voice coil in the 10% of track range despite the increase in TPI, additional attenuation techniques are required.

Alterations of voice coil resonance frequencies have been shown to reduce head deflections. A major driver in this vibration source is the coil resonant frequency. It has been shown that by stiffening the coil to raise its resonance frequency, its interaction with the head of the actuator arm is reduced. One method to stiffen the coil, as described by WO 01/26098 to Heath (hereinafter "Heath"), is to add a pair of plates to the actuator assembly in the area of the voice coil and arms of the yoke. Heath generally describes two embodiments. One positions plates overlying and extending beyond both the upper and lower surfaces of the voice coil to the outer edge of the arms forming the yoke, thus creating a sandwich structure that stiffens the voice coil. The second removes the yoke arms altogether and only uses the pair of plates to retain the voice coil. These embodiments are shown in FIGS. 4A and 4B. One drawback with these approaches is that both plates are located within the magnetic gap between the permanent magnets and the voice coil, such that magnetic field interactions are decreased thereby affecting the efficiency of the voice coil motor. Another drawback with this structure is that the addition of the plates increases the overall height of the voice coil assembly, thereby increasing the height requirements of the overall voice coil motor, e.g., the distance separating the permanent magnets, and increasing the height of the disk drive housing. To compensate and maintain existing disk drive housing height, Heath discloses decreasing the height or thickness of voice coil and yoke arms to accommodate the height of the plates. However, this alteration has potential adverse side effects. Decreasing the height of the voice coil will necessarily remove windings such that the magnetic field intensity of the trimmed voice coil will be reduced thereby decreasing the efficiency of the voice coil motor. Further, Heath in some instances utilizes plates made from stainless steel. This increases the chance of eddy currents being generated within the plates, also affecting efficiency of the voice coil motor.

Another drawback of Heath is that the added weight of the plates influences the efficiency of the servo mechanisms to position the heads. Heath has proposed a method of decreasing this effect by integrating holes into the plates to remove weight. These holes generally reduce the stiffness of the plates, thus making them less effective as dampeners. In addition, Heath proposes reducing the thickness and/or length of the yoke arms, or completely removing the yoke arms, to compensate for the added weight of the skins. The stiffness of the yoke arms is generally related to their thickness. Reducing the arm thickness will create a member that is more prone to vibration. Removing the arms completely also drastically alters stiffness of the overall structure. Decreasing the length of the yoke arms may also adversely affect the disk drive crash stop. In many instances, the crash stop interacts with the yoke arms to prevent the actuator assembly from rotating past a certain point. Alteration of the yoke arms would likely require alteration to the crash stop components, thereby requiring a new design to replace one that now works well, and necessarily creating additional manufacturing steps.

It is also known in the art to wind the wires of the voice coil around a plastic bobbin. Bobbins allow the inner diameter of the voice coil to be precisely controlled. However, as used in the art today, the plastic bobbins offer, at best, a modest increase in stiffness and a related modest reduction of the sway mode, but they do not provide any reduction in bending and torsional loads in any significant manner. Conversely plastic bobbins generally increase the effect of coil bending and torsion loading. In addition, over time the bobbin tends to separate from the coil, thereby degrading performance.

SUMMARY OF THE INVENTION

Thus, it is a long felt need in the field of magnetic disk drive construction to provide a device and method that reduces TMR of the transducer head by reducing the vibrational loads generated by the voice coil and associated components, such as the voice coil yoke. The following disclosure describes a stiffening mechanism that interfaces with the voice coil of a disk drive actuator assembly to reduce the vibrations emanating therefrom. More specifically, one embodiment of the present invention employs a stressed skin stiffener to increase the resonance frequency of the actuator assembly that has been shown to directly influence the operation of the transducer head. This mode is often referred to as the system mode or the butterfly mode. The present invention also reduces torsion and bending of the voice coil that reduces post seek oscillations. One embodiment of the present invention is a stressed skin that interconnects with the voice coil, thus providing increased stiffness thereto. Herein, "stressed skin" refers to a generally thin plate or layer designed to react to twisting and bending stresses that would otherwise deflect the voice coil and yoke. A stressed skin may also include side walls that depend from the thin plate or layer in a generally perpendicular fashion. The wire that forms the voice coil may be wound around the stressed skin, wherein the stressed skin acts as a bobbin. Alternatively the coil may be wound separate from the stressed skin and these components combined in a separate step. In addition, it should be understood that the coil may be comprised of a continuous winding or a plurality of windings that are placed in electrical communication that carry a controlled current that interacts with the magnetic field of the voice coil motor.

It is one aspect of the present invention to provide a stressed skin for interconnection to the voice coil of the actuator assembly to increase the stiffness of the coil and thus reduce vibrations emanating therefrom. Voice coils generally include a continuous length of wrapped wire having weak bindings between the individual wires due to the insulation coating on the wires. The wires are able to move in relation to each other thus providing little resistance to bending and/or torsion. Thus, one embodiment of the present invention is a thin skin that interconnects to at least one surface of the voice coil, thus altering the reaction of the coil to sway, torsion and/or bending loads.

The primary vibrational mode that affects the transducer head position is sway, generally known as the system mode. This mode is also known as the butterfly mode because of its distinctive shape when viewed from above the hard drive. In this mode the coil, actuator arms, and the suspension and heads move in phase from side to side in a plane perpendicular to the axis of the actuator pivot. A second mode that influences post seek oscillations is a twisting motion that is associated with coil torsion. This mode occurs when the arms of the yoke move in opposite up and down directions thereby rotating the coil generally about an axis parallel to the longitudinal axis of the actuator assembly. A third mode that also influences post seek oscillation is the bending mode of the coil, wherein the arms of the yoke move in the same direction up and down to bend the coil.

One embodiment of the present invention is a thin skin that is interconnected to the voice coil to reduce the affects of sway, torsion, and bending. The skin raises the resonance frequency of the voice coil that is associated with the sway mode, the most detrimental to TMR. As briefly mentioned above, the higher the system mode resonance frequency of the actuator assembly, the more influence it has on post seek oscillation performance of the servo mechanism that controls the actuator assembly.

The stress skins may be made out of any material. Preferably, the stress skins are made of a non-conducting material such that an eddy current dampening is eliminated. It is envisioned that the skins be made out of a plastic, a silicon, a ceramic, a composite material, such as carbon fibers in an epoxy matrix, or glass. One embodiment of the present invention is constructed of composite material approximately 0.002 inches thick, wherein another alternate embodiment of the present invention employs a glass skin approximately 0.004 inches thick or plastic skin approximately 0.010 inches thick.

One embodiment of the present invention utilizes two skins interconnected to a top surface and a bottom surface of the voice coil. Another embodiment utilizes two clam shell or pillbox-like skins whose side walls abut or overlap. Other related embodiments of the present invention generally reduce the voice coil thickness in predetermined locations wherein the stress skins are positioned such that they are received into the reduced portion of the coil and are co-planar or flush with the upper surface and lower surface of the voice coil. However, the stressed skin also may be placed within or on the voice coil. Alternatively, embodiments of the present invention are interconnected to the coils such that the upper and lower profiles of the coil are not altered. This option allows for modifications to existing disk drive designs since the remaining geometry of the disk drive, and particularly the permanent magnets, spacers and magnet plates, do not require alteration. Indeed, the magnetic gap between the voice coil motor and the voice coil will not have to be increased, nor will the overall height of the disk drive housing, to compensate for the thickness of the stressed skin. In one embodiment of the present invention, inner windings of the upper surface and the upper and lower surface of the voice coil are selectively removed to form a lip or annulus around the inner perimeter of the voice coil. The stressed skin is then placed within the recess such that the surfaces of the stress skin are co-planar with the upper surface and lower surface of the voice coil. The stressed skin is then bonded to the coil with an adhesive.

Some embodiments of the present invention employ filler materials between upper and lower skins to increase stiffness further. Some fillers that may be employed are foam, aero gel, plastic composite materials, light weight metallic materials, or other similar lightweight materials. As one skilled in the art will appreciate, the filler material will decrease a drum resonance mode in the skins while increasing the stiffness of the system as a whole. Further, one skilled in the art will appreciate that any type of filler material may be used to achieve this result so long as the detrimental effects, such as eddy currents and substantial weight gain are not realized.

Another aspect of the present invention is that it is light and easily integrated into to existing voice coils. More specifically, embodiments of the present invention are fabricated of thin materials that have little weight impact on the actuator assembly. Light weight, or more specifically low rotary inertia, is required for fast seek times on high performance hard disk drives. Also, the stressed skins of some embodiments have no effect on internal clearances, so there is no need to alter the existing components of the disk drive other than the coil. Further, the present invention does not require interconnection to the yoke arms of the actuator assembly, thus, the arms do not have to be altered to maintain weight and the crash stop performance of the disk drive is maintained.

One skilled in the art will appreciate that the stiffening method of the present invention provides an easy way for manufacturers to shift the resonant frequency of the voice coil such that the servo controller can more efficiently, compensate vibrations generated thereby, thus allowing the voice coil to meet its post seek oscillation and/or TMR budgets. One skilled in the art will also appreciate that the present invention may be easily implemented into existing disk drives designs.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 6A is a perspective view of a computer-simulated coil yoke arms and voice coil without a bobbin.

FIG. 6B is a perspective view of the coil yoke arms and voice coil of FIG. 6A, further including a plastic bobbin located inside the voice coil and having a height approximately one-third that of the voice coil.

FIG. 6C is a perspective view of computer-simulated yoke arms and voice coil as described in WO10/26098, with one skin cut away to show the reduced yoke arm.

FIG. 6D is a perspective view of computer-simulated yoke arms and voice coil, with stressed skin as shown in FIG. 5J.

Figure 1:
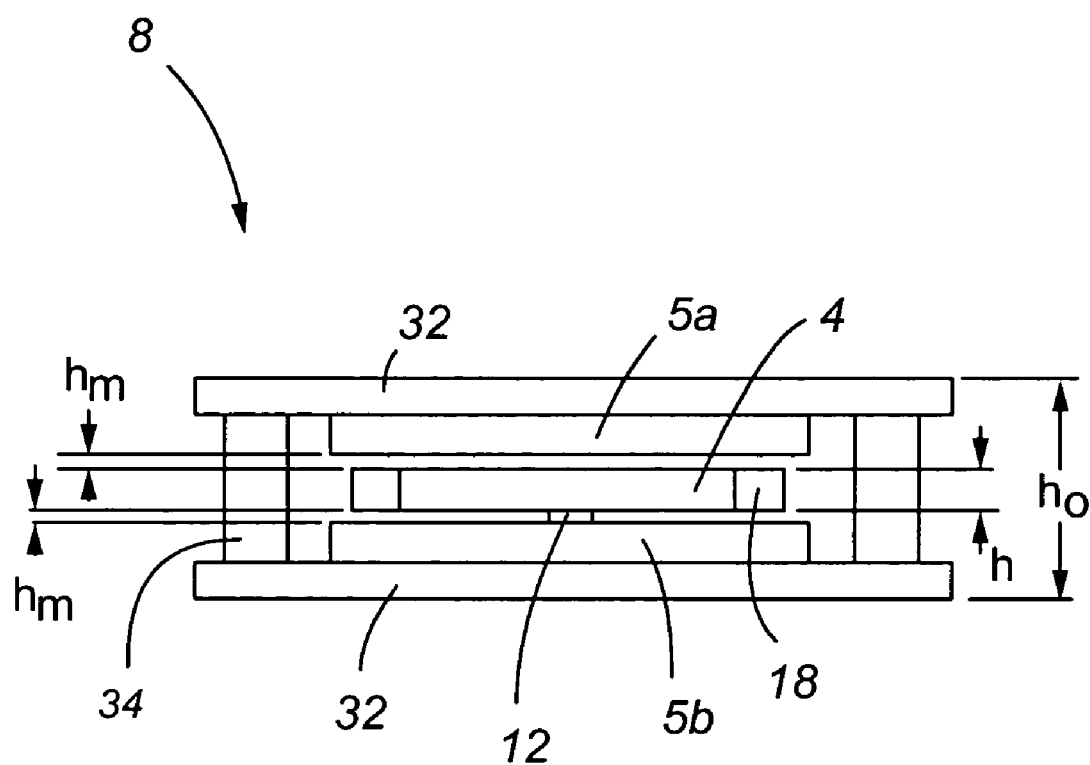
FIG. 1 is a front elevation view of a typical voice coil motor.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Referring now to FIGS. 2, 3 and 5-8, a voice coil stiffening device is shown. More specifically, in one embodiment of the present invention, a stressed skin member 2 is provided that interfaces with a voice coil 4 of an actuator assembly 6 that is driven and controlled by a voice coil motor 8 of a disk drive 10. As the actuator assembly 6 rotates about the actuator pivot 12, the voice coil 4 tends to vibrate for various reasons and in various ways. These vibrations cause off-track motion restricting track density and cause post seek oscillation degrading performance. By stiffening the voice coil 4, the vibrations emanating therefrom are substantially reduced and performance is enhanced.

Referring now to FIG. 1, a front elevation cross sectional view of a voice coil motor 8 is shown. A typical voice coil motor 8 includes two plates 32 that are positioned relative to each other and held in place by a plurality of spacers 34 that also generally provide a magnetic flux return path between the top and bottom permanent magnets 5. Magnets 5 of the voice coil motor 8 are interconnected to the plates, thus providing a gap in which the voice coil 4 and yoke arms 18 reside. Introduction of an electric current through the voice coil 4 interacts with the magnetic field of the permanent magnets 5, thus causing the actuator assembly to rotate about the central hub 12. As shown herein, one skilled in the art will appreciate that it is desirable to maintain or reduce the overall height ($h_o$) of the voice coil motor 8 in order to ensure the smallest disk drive profile. In addition, as will be described in more detail below, the introduction of stiffeners on either surface of the voice coil/yoke arm assembly can affect the magnetic gap height ($h_m$) that exists between the top magnet 5a and the bottom magnet 5b and the voice coil 4 which will necessarily affect the performance of the system. Further, generally included within the voice coil motor 8 is at least one crash stop (not shown), which typically engages the yoke arm 18 when the actuator assembly rotates past a predetermined point. These crash stops are typically interconnected to the base plate of the disk drive.

It is important to note that any change with respect to weight or configuration of the voice coil 4 will necessarily affect the performance of the system. More specifically, when a data track is to be accessed by the head of the actuator assembly, an algorithm directs the amount of current to be generated into the voice coil 4. This current interacts with the magnetic fields of the permanent magnets 5 producing force on the coil. This will force the voice coil in a direction that will place the head of the actuator assembly substantially near the intended data track. After the data track is acquired, minute adjustments will be made to the current as the head accesses information from the storage disks related to its position. By adding additional weight to the actuator assembly, especially the voice coil or the yoke arms, these gross and fine tuning movements of the actuator assembly will be influenced. More specifically, as the weight is increased, the inertia of the actuator assembly will be increased such that it will take more time to achieve the desired rotational position of the actuator assembly. One way in which weight is increased is by adding stressed skins to the actuator assembly. To counteract the effect of this added weight, the coil may be reduced in size or windings removed or the yoke arms may be altered to decrease their weight to accommodate the weight of the stressed skin. If the coil is altered it will need to be re-tuned, but with less cross sectional area it will provide less force. Thus, it is desirable to stiffen the voice coil 4 while maintaining a lightweight configuration so that other performance parameters, such as the amount of the magnetic field generated by the voice coil motor and the number of windings and the resistance of the coil are substantially unaffected.

Figure 2:
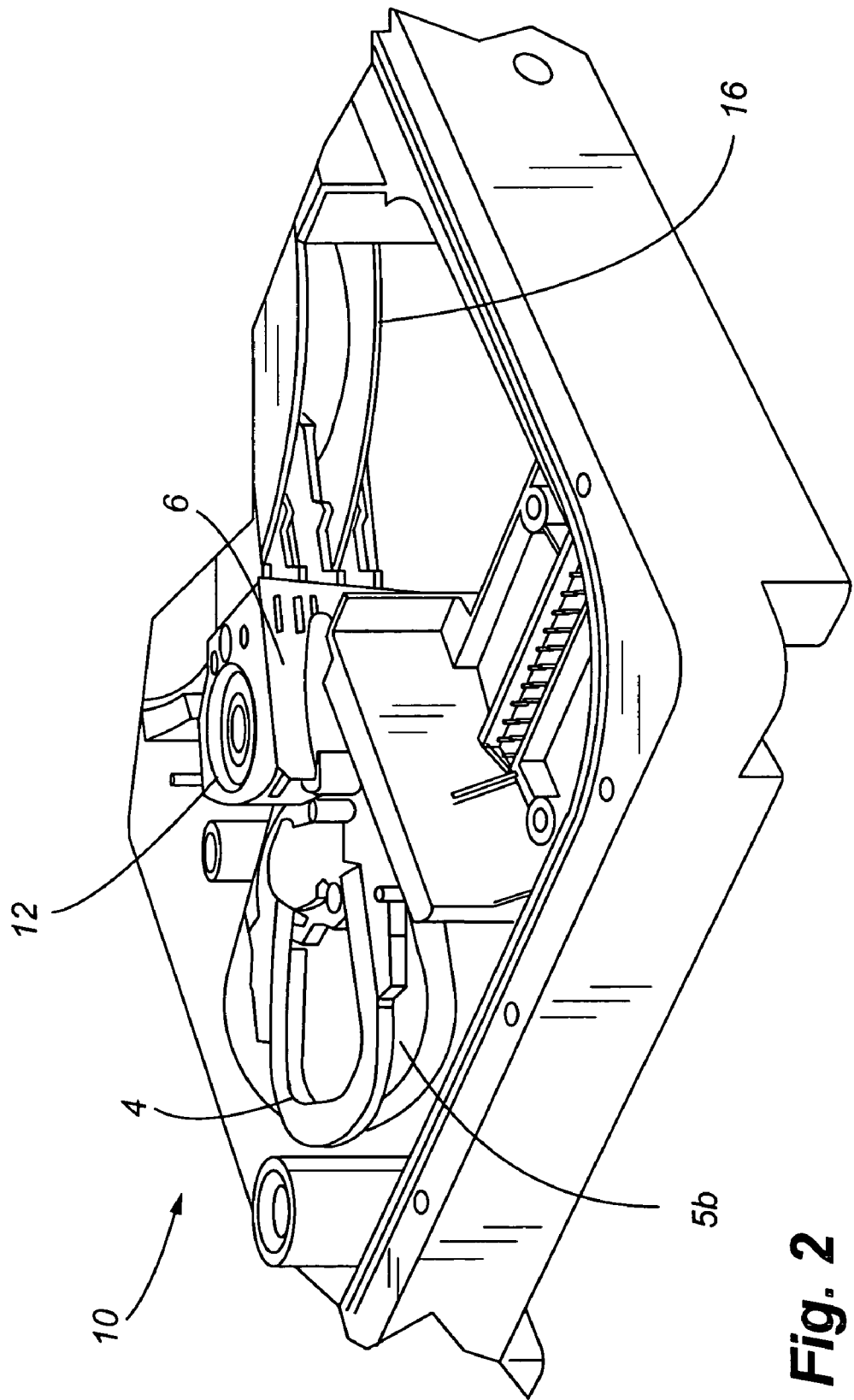
FIG. 2 is a partial perspective view of a disk drive.
Figure 3:
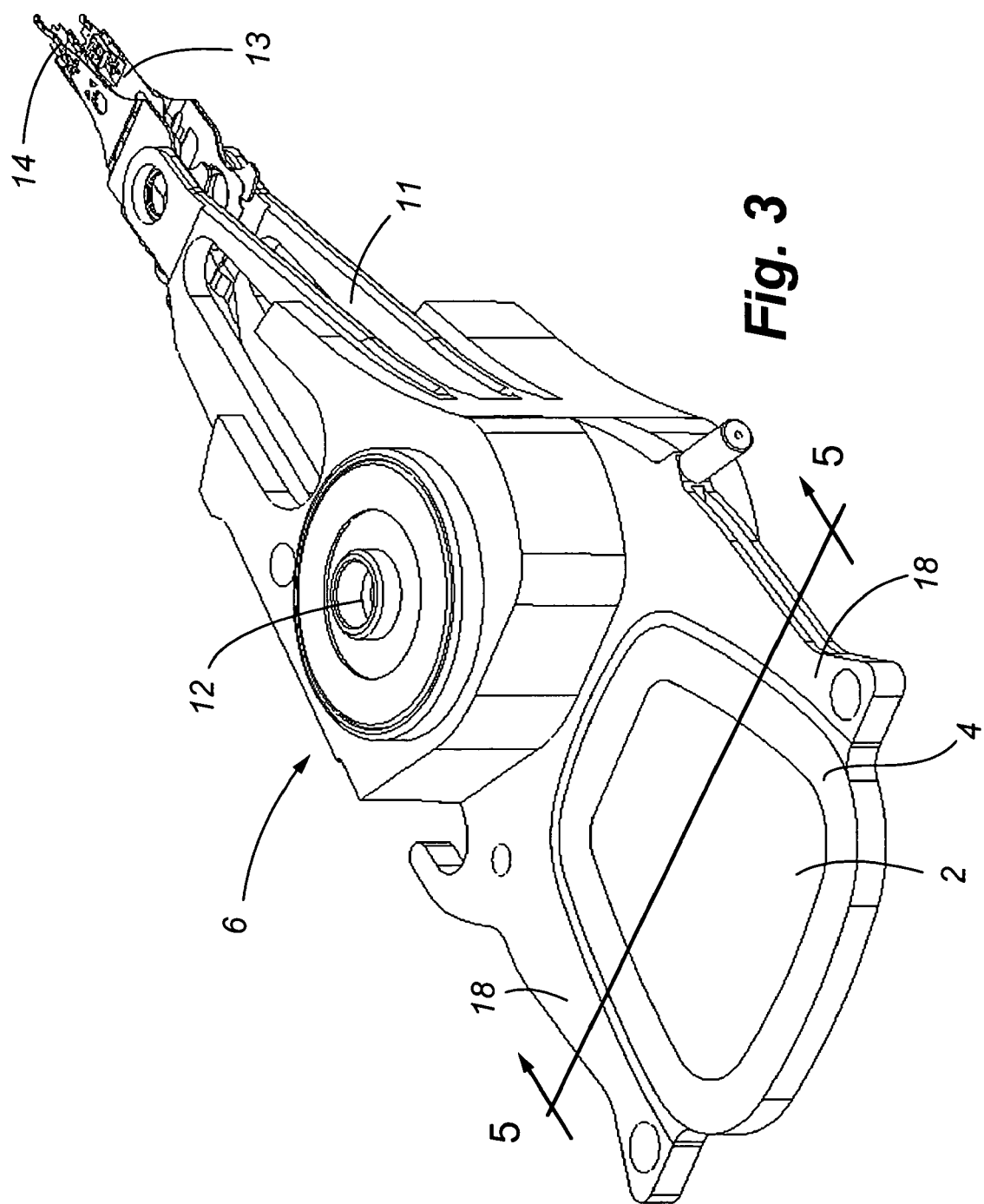
FIG. 3 is a perspective view of an actuator assembly employing a stressed skin of one embodiment of the present invention.

Referring now to FIG. 2, a perspective view of the disk drive 10 is shown that generally includes one or more storage disks 16 that rotate in proximity to the actuator assembly 6. With further reference to FIG. 3, the actuator assembly 6 includes at least one actuator arm 11, a suspension or load beam 13, which is attached to the actuator arm, and a slider attached to the distal end of the load beam. A transducer or read/write head 14 is located near the trailing edge of the slider. Extending away from the actuator pivot 12 in a direction opposite the actuator arm 11 are two arms 18 that form a yoke that secures the voice coil 4 to the actuator assembly. Typically, stationery permanent magnets 5a, 5b are positioned on each side of the voice coil and the magnetic field of the permanent magnets 5 interact with the changing current in by the voice coil 4 to control the relative position of the head 14. As previously noted, the actuator assembly 6 is operably interconnected to the magnetic disk drive 10 through the actuator pivot 12 that allows rotation of the actuator assembly 6 when it is driven by the voice coil motor 8, thereby selectively positioning the head 14 above a predetermined data track of the storage disk.

The voice coil 4 and the associated yoke arms 18 will tend to vibrate due to the cessation and directional alterations of the actuator assembly 6. These stops and starts will necessarily vibrate the yoke arms 18 and the voice coil 4 and will affect the location of the head 14. Any vibrations affecting the head 14 will generally influence its performance. As shown in FIGS. 3 and 5, at least one stressed skin 2 is positioned within the void 20 defined by the windings of the voice coil 4. The stressed skin 2 generally aids in the prevention of undesirable voice coil 4 motion, which includes bending, sway and torsion. Here, and with reference to FIG. 3, bending refers to motion of the voice coil 4 with both yoke arms 18 moving up and down in unison. Sway refers to deflection of the voice coil 4 in a plane perpendicular to the axis of the actuator pivot 12. Torsion refers to the yokes moving up and down out of phase with each other.

Figure 4A:
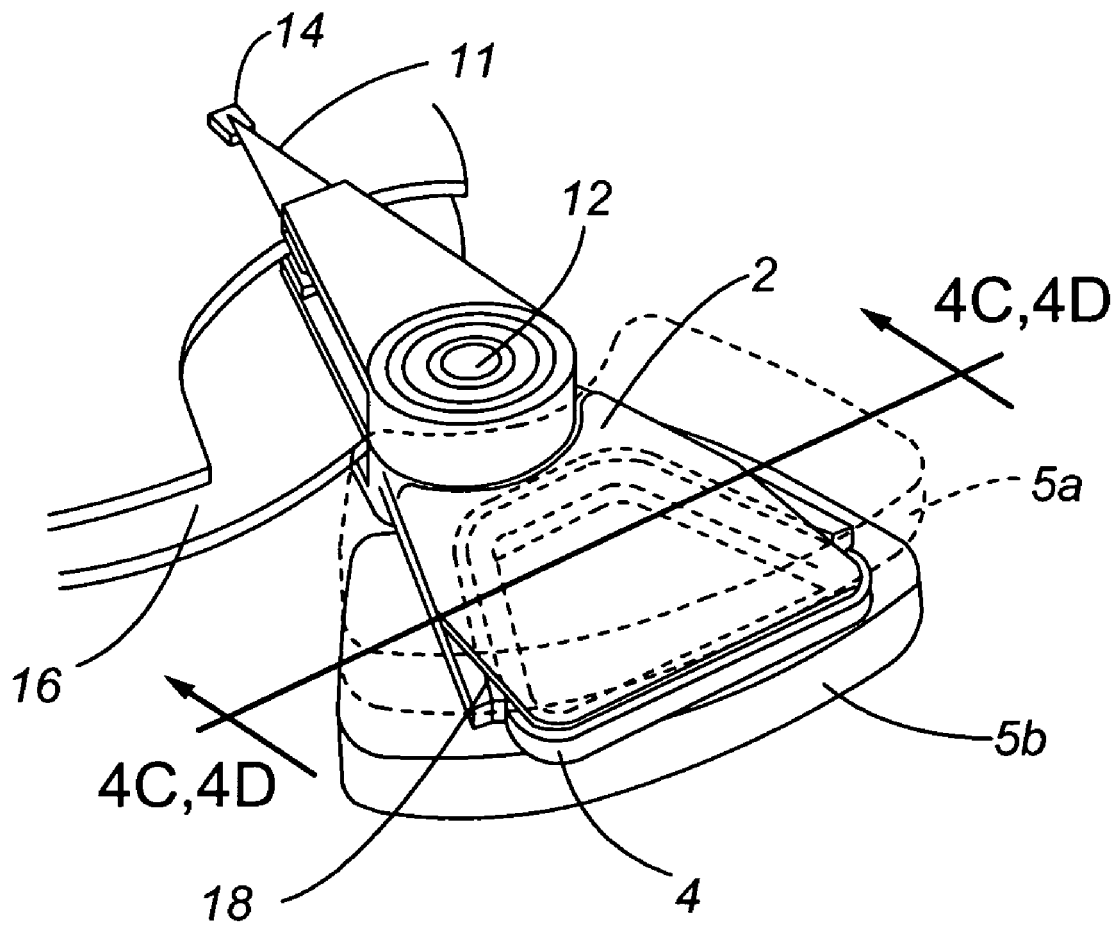
FIGS. 4A-4D are views of prior art voice coil assemblies.
Figure 4B:
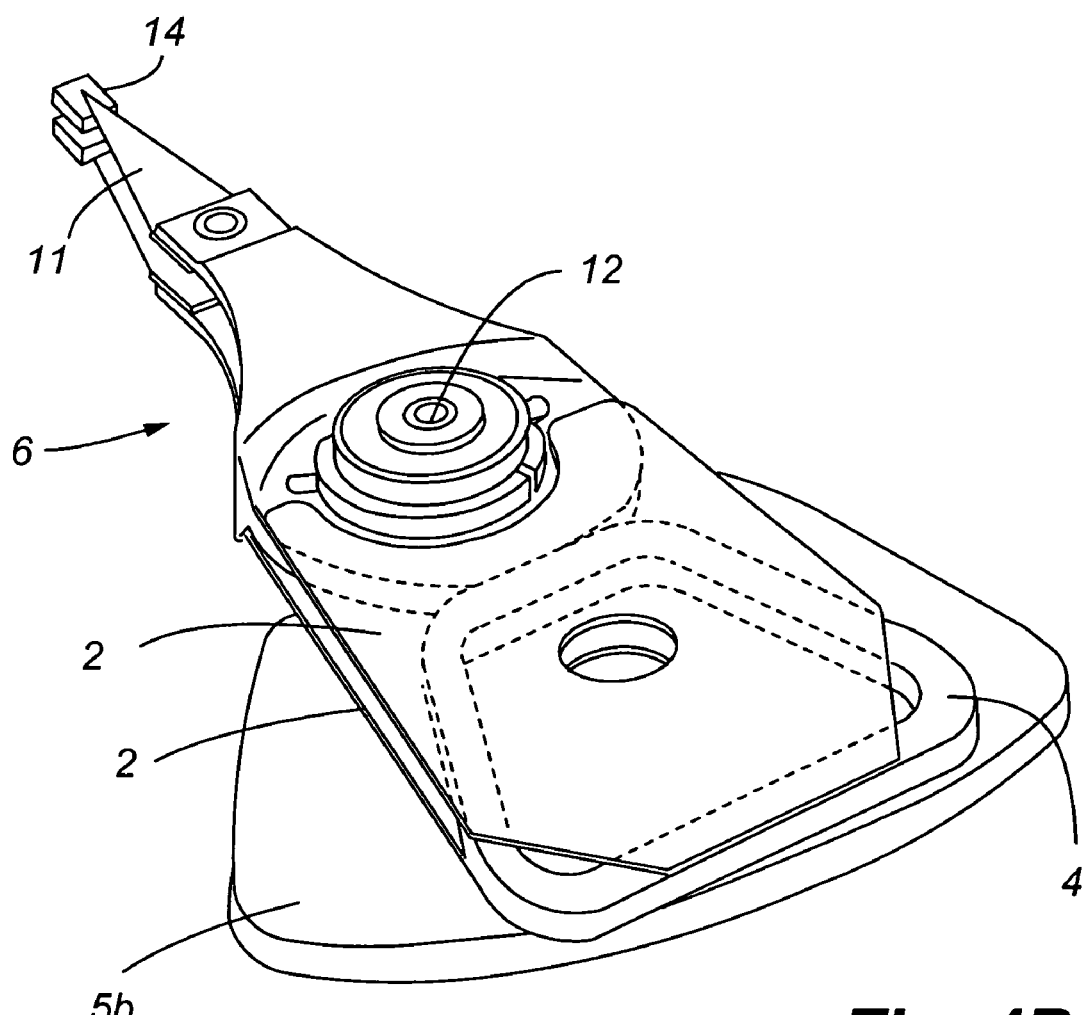
Figure 4C:
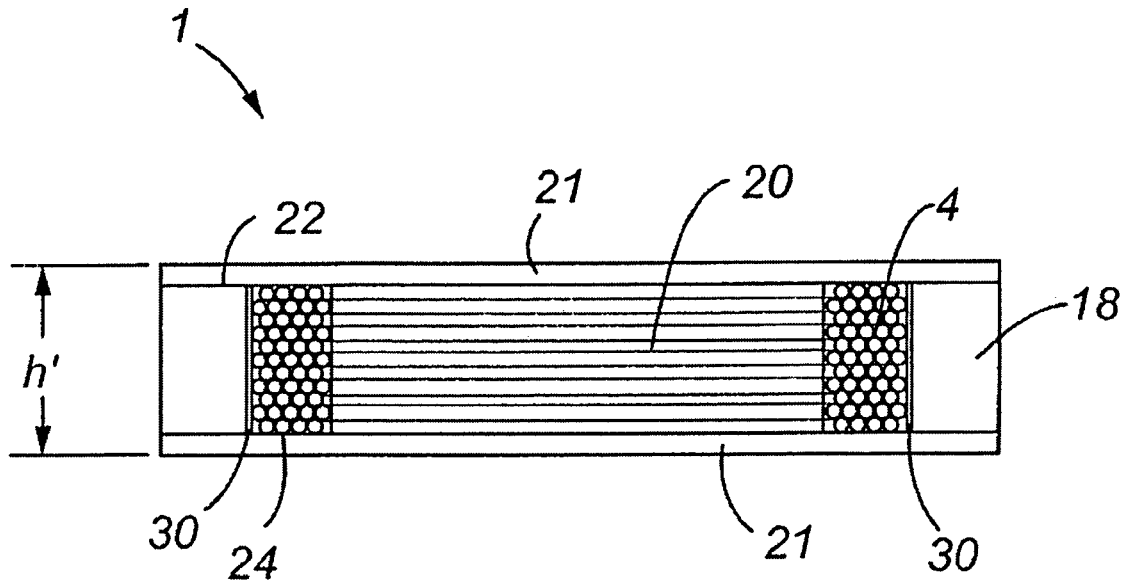
Figure 4D:
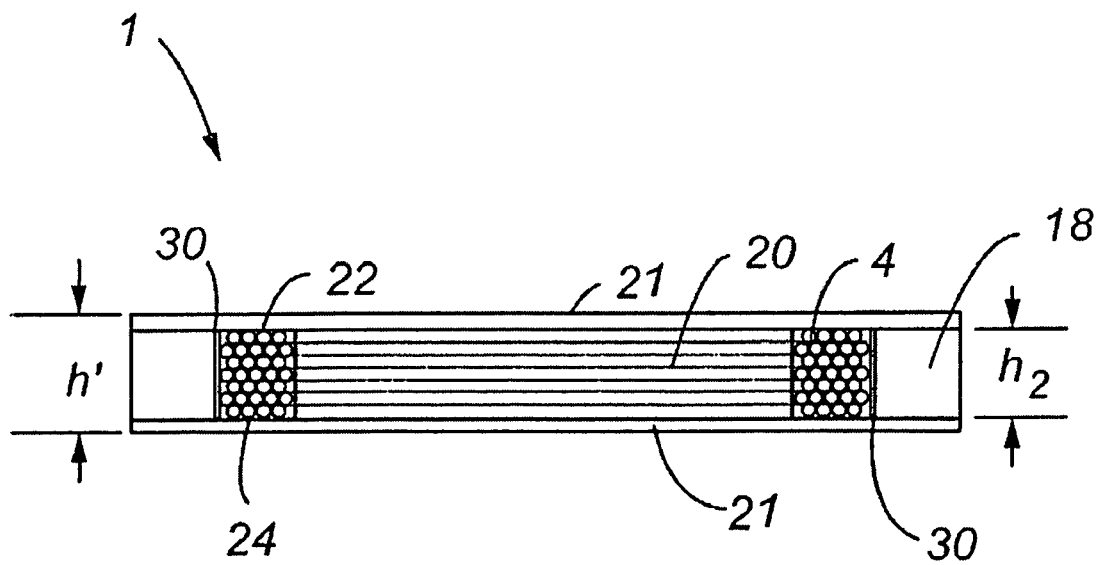

Referring now to FIGS. 4A-4D, a prior art voice coil stiffener is shown. Here, plates 21 are interconnected to the voice coil 4 and yoke arms 18 on the top surface 22 and bottom surface 24 thereof. Thus, the height (h') of the voice coil assembly, as shown in FIGS. 4C and 4D, must be increased relative to the height of the yoke arms and coil by twice the thickness of the plates 21 in order to accommodate the added thickness of the two plates. This increased height potentially affects other components of the disk drive that may have to be altered to compensate for the altered component height (h'). For example, the spacing between the permanent magnets 5 may be increased to accommodate the increased height (h'). In turn, this will likely increase the overall height of the disk drive housing. Depending upon the application for the disk drive, such as standardization of dimensions, increasing the overall height may not be an acceptable option. In addition, the plates 21 create a barrier between the voice coil 4 and the permanent magnet 5 such that magnetic interactions between the voice coil motor and the voice coil 4 may be impacted.

To address problems mentioned in connection with the embodiment of FIG. 4A, the height ($h_2$) of the yoke arms 18 and the coil 4 may be reduced to ensure that the overall height (h') of the voice coil assembly remains constant the addition of the plates 21. This is seen by comparing FIGS. 4C and 4D, where the height of the arms 18 and coil 4 in FIG. 4D is reduced compared to that shown in FIG. 4C. Alternatively, as shown in FIG. 4B, the yoke arms may be completely eliminated and the plates used to secure the voice coil to the actuator hub 12. As mentioned in the case of FIG. 4D, if the overall height h' remains constant the coil height must be reduced. To accommodate the reduced height, the voice coil may have less windings. Less windings means the voice coil will generate less torque, thereby increasing the seek time and reducing the performance of the drive.

Figure 5A:
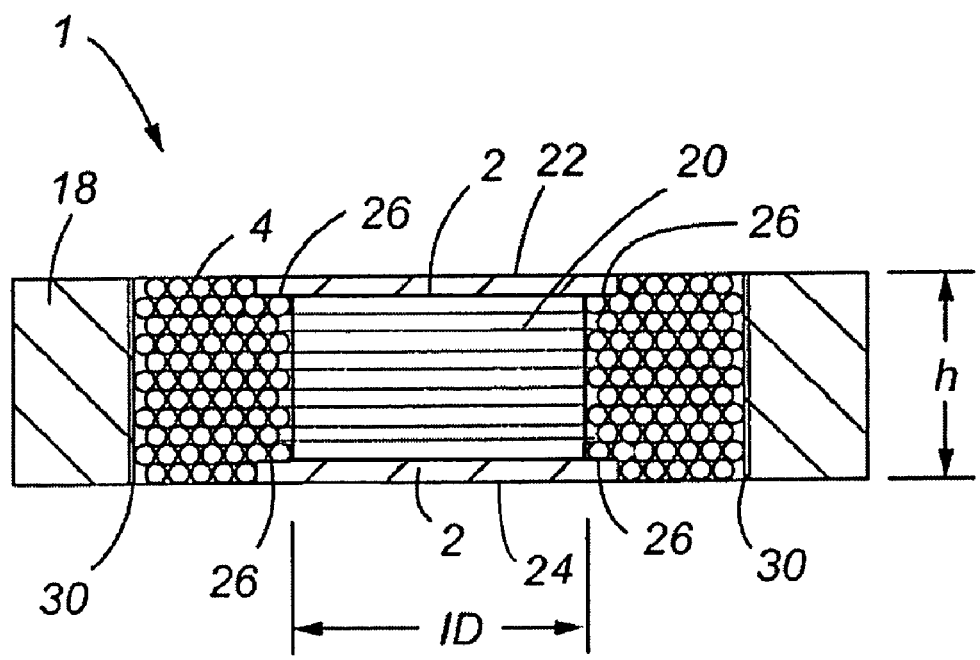
FIG. 5A is a cross-sectional view of one embodiment of stressed skins of the present invention.
Figure 5B:
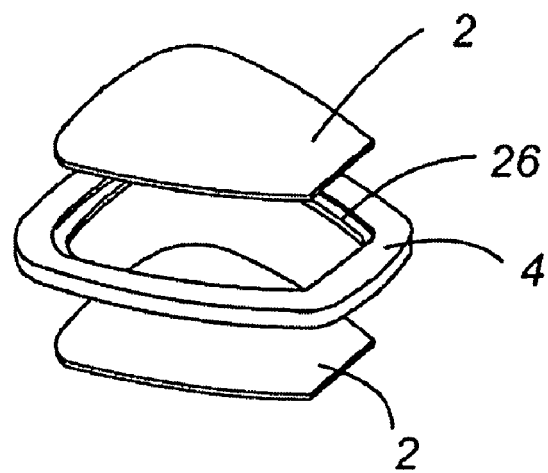
FIG. 5B is an exploded perspective view of the coil and stressed skins illustrated in FIG. 5A.

Referring now to FIG. 5A, a cross-section of an actuator assembly employing one embodiment of the present invention is shown. In this embodiment, the voice coil 4 includes two shoulders 26 wherein the windings in that area have been selectively removed. The stressed skins 2 are adhered within the shoulders 26 of the voice coil 4 such that the outer surface of one stressed skin 2 is substantially co-planar with the upper surface 22 of the voice coil 4 and the outer surface of the other stressed skin is substantially co-planar with the lower surface 24 of the voice coil. The figure also shows a bonding layer 30 between the voice coil 4 and the yoke arms 18 that is employed in various embodiments of the present invention. FIG. 5B illustrates the recess formed by the shoulder 26 in an exploded view. This embodiment of the present invention has the benefits of maintaining the overall height (h) of the actuator assembly in the area of the yoke arms 18, while providing an enhanced stiffness to the stressed skin coil assembly 1. Alternatively, it should be further appreciated that only one stress skin may be used. Therefore, only one set of shoulders need be formed in the voice coil. In this alternative embodiment, loss of torque will be reduced because fewer windings are eliminated.

One skilled in the art will appreciate that since winding sections have been removed from the voice coil 4, the interactions between the voice coil 4 and the voice coil motor will necessarily be affected. However, it should be understood that the yoke arms 18 may be spread in width or reduced in thickness to permit additional windings to be added to the outside diameter (OD) of the voice coil. But this will increase the inertia of the coil assembly and decrease the magnetic field of the permanent magnets. Alternatively, the yoke may remain unchanged and additional windings added to the inner diameter (ID) of the coil, provided the coil legs avoid the neutral line of the magnets.

It should also be understood that as described throughout, the word "coil" refers to a continuous winding of wire. However, it should be appreciated that a plurality of separate coils may be operably interconnected such that a net number of turns (windings) may be achieved. This concept refers to the method of manufacturing or implementing the present invention such that it may be desirous to wind a plurality of separate coils having different geometric shapes, as can be easily envisioned in FIG. 5F, and have them linked in electrical communication. However, other manufacturing techniques are available that may create windings of varying cross-sections that should be appreciated by one skilled in the art.

Figure 5C:
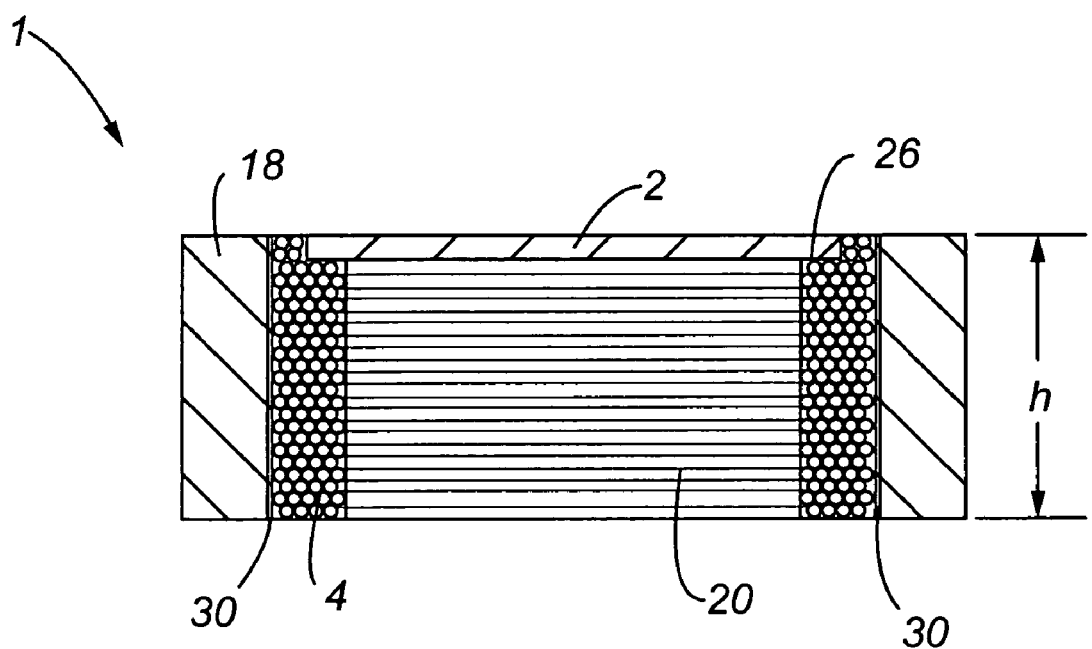
FIGS. 5C-5L are cross-sectional views of stressed skins of further embodiments of the present invention.
Figure 5D:
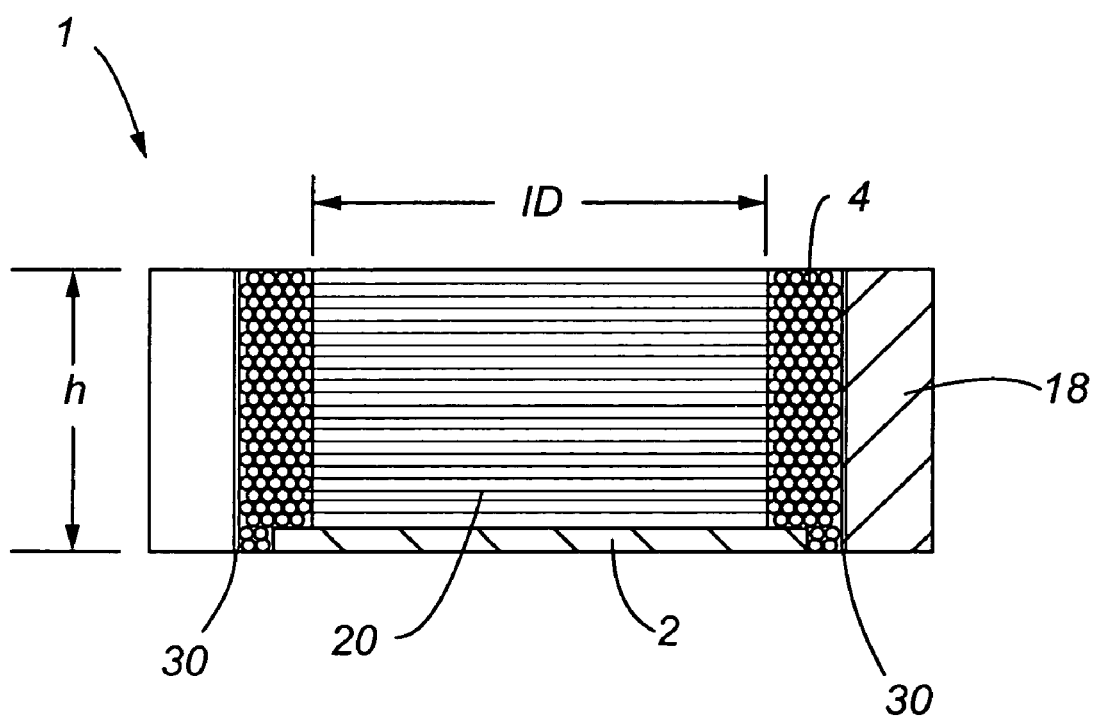

Referring now to FIGS. 5C and 5D, one embodiment of the present invention is shown employed along with a voice coil 4 of varied cross-section. These configurations are similar to those described above in connection with FIG. 5A, however, the voice coil 4 has been altered to provide a single shoulder 26 for the interconnection of the stressed skin 2. This arrangement has the advantage of providing a voice coil 4 that spans the entire height (h). In addition, the magnetic gap between the permanent magnets and the voice coil 4 as shown in both figures is equal.

Figure 5E:
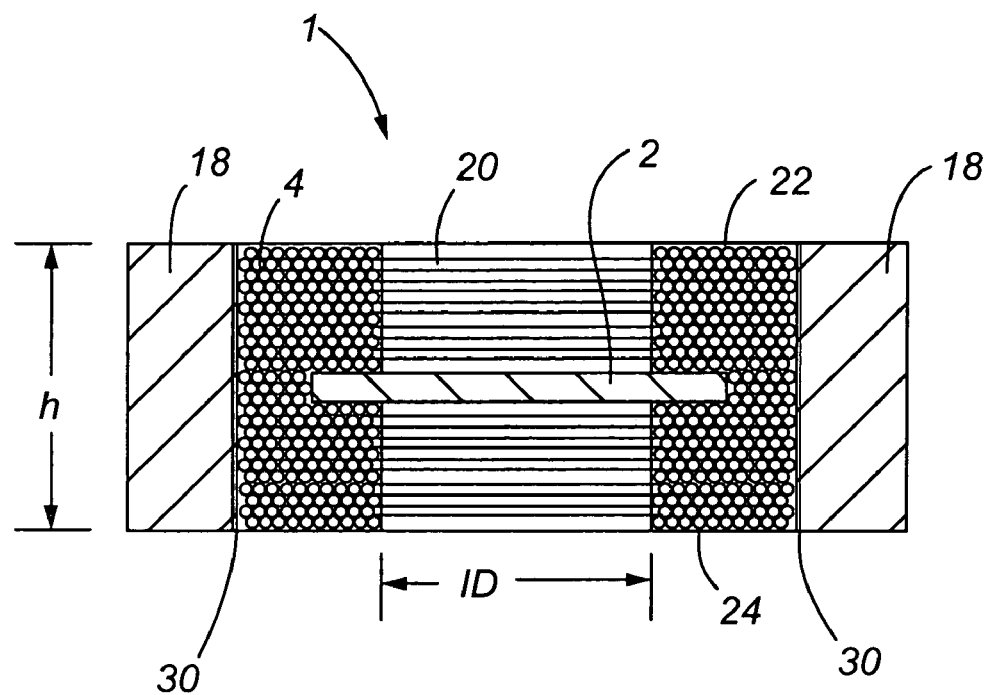
Figure 5F:
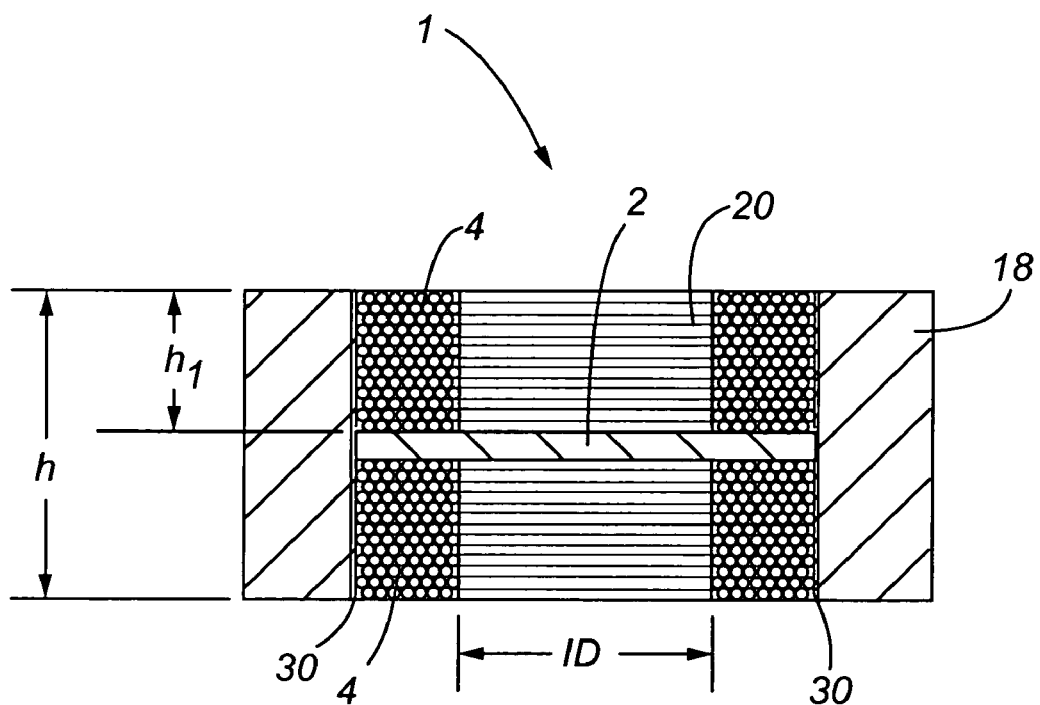

Referring now to FIGS. 5E and 5F, yet other embodiments of the present invention are shown incorporated into the voice coil 4. Here, a middle portion of the voice coil 4 has been altered to include a groove or annulus in the center of the voice coil for the incorporation of a stressed skin 2. Here, the overall height (h) of the actuator assembly in the area of the yoke arms 18 and the voice coil 4 is unchanged and the magnetic interactions between the voice coil motor and the voice coil 4 are unaffected by the presence of the stressed skin 2. With reference specifically to FIG. 5F, the stressed skin 2 is sandwiched between two separate voice coils 4 generally in the middle of the yoke arms 18. In addition, the stressed skin 2 may be integrated, perhaps interference fit, into the yoke arms 18 for increased stiffness. It should be understood by one skilled in the art that the phrase "stressed skin" as used herein is not limited to members that interface with the upper surface 22 or the lower surface 24 of the voice coil 4. More specifically, "stressed skin" also refers to members that carry twisting and bending stresses.

Figure 5G:
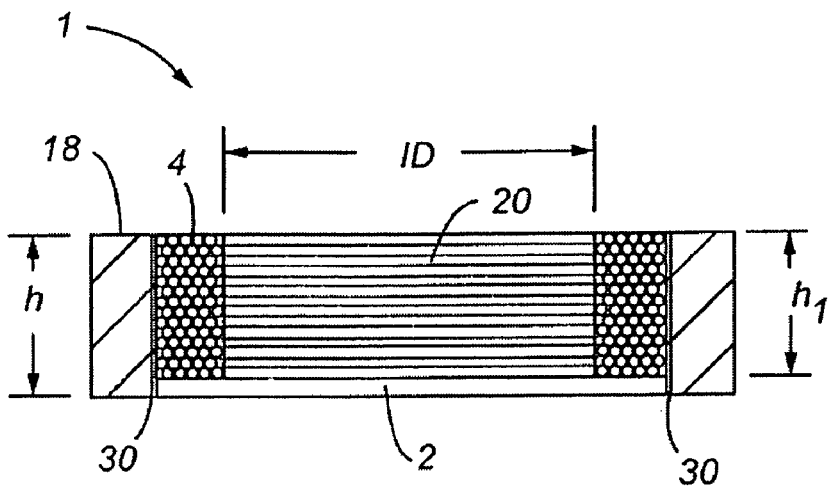
Figure 5H:
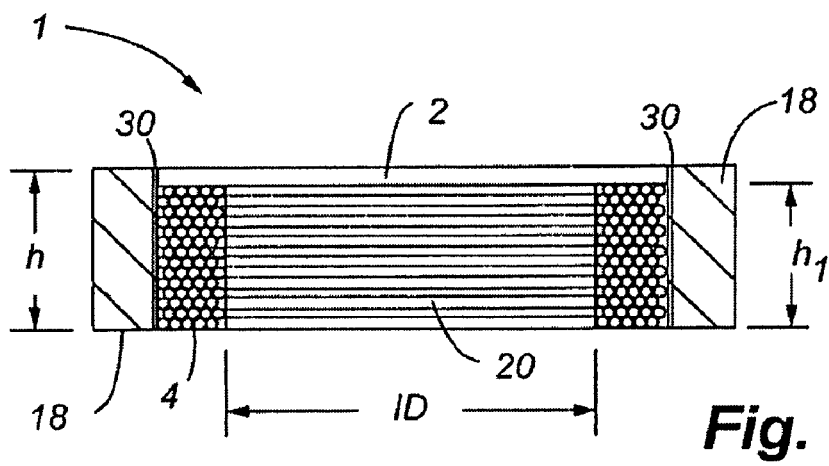

Referring now to FIGS. 5G and 5H, a stressed skin 2 of another embodiment of the present invention is shown interconnected to the voice coil 4 and yoke arm 18. Here, the stressed skin 2 may be incorporated adjacent to the top surface (FIG. 5H) or the bottom surface (FIG. 5G) of the voice coil 4. As shown, voice coil 4 is simply wound to a different height ($h_1$) so that the overall height (h) of the actuator assembly at the location adjacent to the yoke arms 18 is unaffected. Because the voice coil 4 is fabricated to a shorter height ($h_1$), which may affect the magnetic field generated, the outer diameter (OD) of the voice coil 4 may be increased to provide additional windings to provide a stronger magnetic field. Due to the stiffness of the stressed skins the width of the yoke arms can be decreased while still maintaining or increasing the overall stiffness of the coil/yoke structure.

Figure 5I:
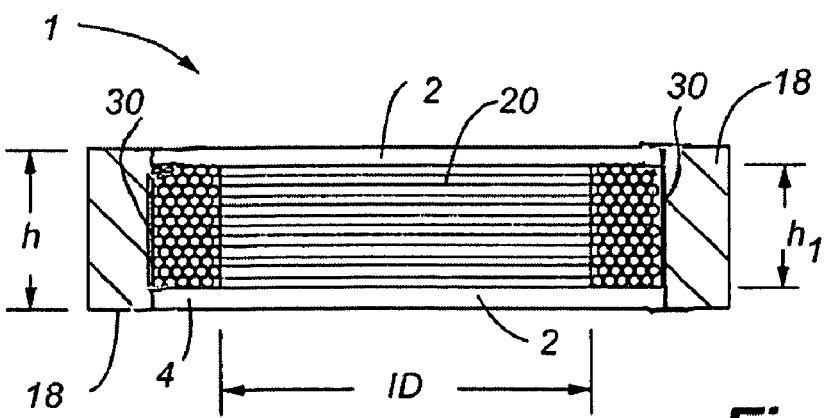

Referring now to FIG. 5I, still yet another arrangement utilizing the stressed skin 2 of the present invention are shown. A single voice coil 4 is utilized that has a shorter height ($h_1$) than that of the yoke arm 18. Because of the added stiffness provided by the stressed skins in this embodiment the width of yoke arms could be decreased. It should be understood by one skilled in the art that the number of windings in the coil could be increased, either at the inner or outer diameters of the coil 4, thus providing coil 4 that generates the same torque as commonly used coils. However, it should be also understood that such alterations of coils may increase the weight of the actuator assembly, which can be offset by reducing the width of the yoke arms. Further, the stressed skins 2 of this embodiment may be interconnected to the yoke arms 18 with bonding material 30, or alternatively be interference fit into the yoke arms.

Figure 5J:
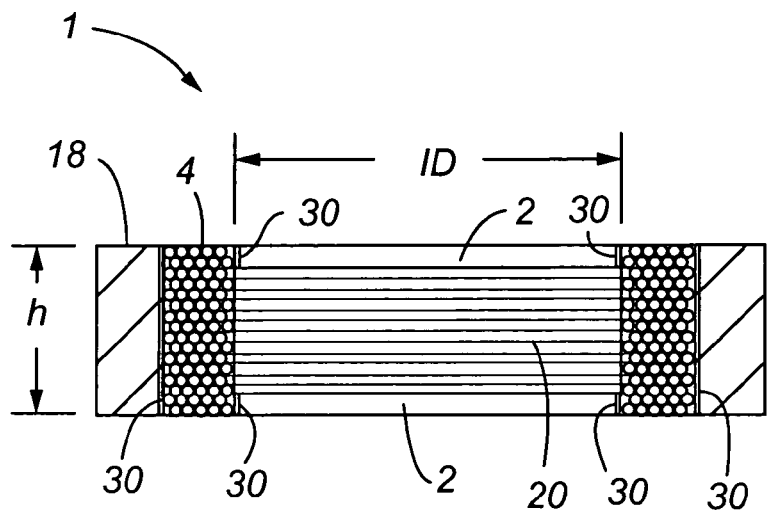

Referring now to FIG. 5J, another arrangement employing the present invention is shown that includes stressed skin 2 interconnected to the inner diameter (ID) of the voice coil 4. This embodiment has the advantage of maintaining the cross sectional area of the voice coil. In addition, the stressed skins 2 are positioned flush with the top surface 22 and the bottom surface 24 of the stressed skin coil assembly 1, thereby maintaining the height (h) of the assembly 1. Preferably, the stressed skins 2 are bonded to the voice coil's inner diameter (ID).

Figure 5K:
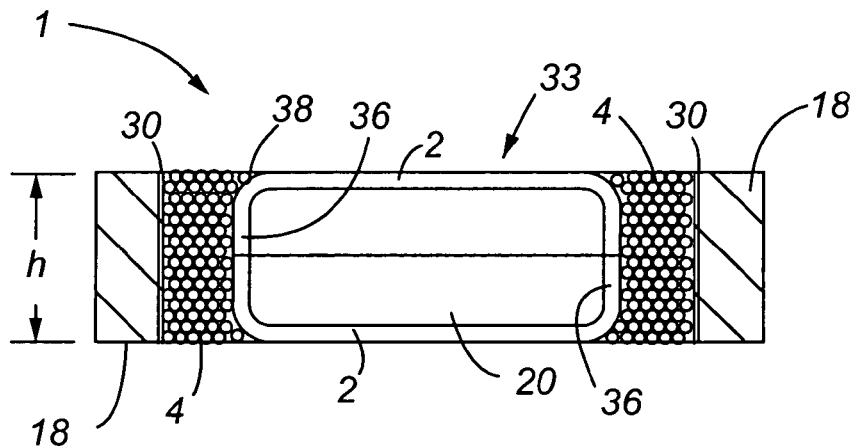
Figure 5L:
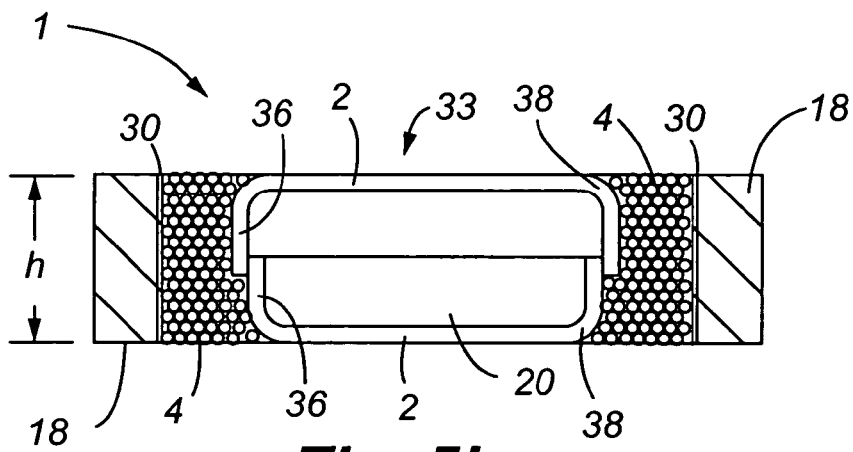

Referring now to FIGS. 5K and 5L, embodiments of the present invention that employ a combination stressed skin and bobbin are shown. More specifically, a bobbin 33 is provided that is adapted to receive the voice coil 4 windings. The use of bobbins in these embodiments creates a slightly increased moment of inertia, wherein sufficient stiffness is provided to help alleviate the affect of sway, bending and torsion. In addition, the bobbin 33 is preferably a clam shell or pillbox shaped wherein two halves are butted and bonded to each other (FIG. 5K). Each half of the bobbin 33 comprises a stressed skin portion 2 and depending side walls 36. Alternatively, the two halves of the bobbin 33 may have an overlapping interface where a smaller half is interference fit into a large half thereby providing an outer surface for receiving the voice coil 4. Although small radii 38 are shown integrated into the top and bottom edges of the bobbin 33, one skilled in the art will appreciate that ninety degree corners ideally are preferred. However, machining and manufacturing techniques may be limited such that rounds are necessarily included. The bobbin 33 may also be formed as a hollow or semi-hollow member, by blow molding for example, wherein weight is minimized.

One skilled in the art should appreciate that any of the stressed skins 2 presented thus far may be structurally optimized. More specifically, lighting holes may be included in the stressed skin 2 to yield a truss-like structure wherein the remaining material efficiently carries the vibrational loads.

In addition, in each of the embodiments of FIGS. 5A-5L, it should be appreciated that open space at the center of the voice coil may be filled with a foam core or other dampening material such as fixed foam, foam, aero gel, plastic, composite materials, lightweight metallic materials, or other similar lightweight materials. Adding a dampening material will enhance the vibration dampening characteristics of the overall structure while adding little additional weight.

Referring now to FIGS. 1-3 and 5-8, one method of manufacturing the configuration of a stressed skin coil assembly 1 is described. One skilled in the art will appreciate that one, or a plurality of voice coils 4 may be easily wound around a pair of top and bottom stressed skins with an inner core, or around stressed skins with side walls as shown in FIGS. 5K and 5L. Alternatively, a spool or bobbin of varying diameters may be provided such that the windings are made therearound, wherein the spool would subsequently be removed to provide at least one shoulder 26, or annulus, for the interconnection of the stressed skins 2. The stressed skins 2 are adhered to the voice coil with adhesives, such as cyanoacrylate or a stiff epoxy. The stressed skins 2 are made of reinforced plastic, glass, composite materials such as carbon fibers in an epoxy matrix, ceramic materials such as alumina and glass. Metal matrix materials can be used if proper attention is paid to eddy current damping effects. Further, the void 20 between upper and lower stressed skins 2 may be filled with a foam to damp the stressed skins or to aid in the manufacturing process. Fillers generally used may be PMI foams, polystyrene foams (a honey comb material) and foamed glass such as aero gel. The fillers are desirable since they increase the stiffness and damping of the system while adding very little weight thereto.

A computer-simulated finite element analysis of one embodiment of the present invention, compared to other designs, including the prior art Heath design, was conducted. The analysis was simplified to include a generic coil, the core of the actuator, a generic coil holder and various bobbin or stiffening options. A single multi-purpose model was simulated and the individual cases were analyzed by adjusting the material properties, sometimes to zero. In the simulation, the core structure was fixed at the place where it would attach to a pivot cartridge. An entire actuator assembly, including head gimbal assemblies and bearings, was not included in the model. The four embodiments analyzed are shown in FIGS. 6A-6D. FIG. 6A is a standard coil structure with no bobbin or stiffener. This is the baseline case. FIG. 6B is a coil structure with a conventional plastic bobbin located at the mid plane of the coil. FIG. 6C is a coil with a stiffening arrangement similar to that disclosed by Heath. The coil holder arms or yokes have been cut back. The plates 21 utilized in the Heath model are 2 mils (0.05 millimeters) thick stainless steel. FIG. 6D is a coil with a stressed skin component of the present invention. Both the embodiments of FIGS. 6C and 6D included a foam core. The model of FIG. 6D also used stainless steel skins, although electrically nonconductive materials would have been preferred. One could use glass having a thickness of 6 mils (0.15 millimeters) that would have the same stiffness and mass as 2 mils of stainless steel, but without the electrical conductivity problem.

The material properties used for the simulation are set forth below in Table 1.

TABLE 1

| Part | Material | Modulus (Mpa) | Density (Kg/m³) | Poisson Ratio |
|---|---|---|---|---|
| Yoke | 6061 Aluminum | 70,000 | 2730 | 0.3 |
| Coil | Cu clad Al wire | 39,660 (Ex) | 2246 | 0.3 |
| Boxing sheets | Stainless Steel | 200,000 | 7840 | 0.3 |
| Bonding | Epoxy | 3000 | 1200 | 0.2 |
| Bobbin | Plastic | 7600 | 1400 | 0.16 |
| Coil fill | Plastic foam | 0.077 | 160 | 0.45 |

For each of the four embodiments, the natural frequency of three modes was calculated. A sway mode frequency is necessary for a high system mode. High first bending and first torsion mode frequencies are important to minimize post seek oscillation. Inertia about the pivot point was also calculated for each embodiment. Low inertia is important for fast seek times. The results are summarized in Table 2, below. For all cases the height of the coil was held constant.

TABLE 2

| Parameter Tested | No Bobbin FIG. 6A | Plastic Bobbin FIG. 6B | Heath-like concept FIG. 6C | Stressed Skin concept FIG. 6D |
|---|---|---|---|---|
| Sway Mode (Hz) | 6040 | 8480 | 10,710 | 10,480 |
| 1$^{st}$ Bending Mode (Hz) | 1380 | 1280 | 1800 | 1460 |
| 1$^{st}$ Torsion Mode (Hz) | 2170 | 2150 | 4070 | 3040 |
| Inertial about pivot (gm * mm²) | 780 | 930 | 1010 | 950 |

Based on these results, it is seen that the sway mode frequency for the embodiment of the present invention (FIG. 6D) is a substantial improvement from the baseline case with no bobbin and approximately equal to the prior art Heath embodiment. The plastic bobbin of FIG. 6B, assuming it is well bonded to the coil, is approximately halfway in-between. The sway frequency for the present invention is large enough to cause a sizeable increase in the actuator system mode. The plastic bobbin embodiment would see a more modest increase.

The first bending mode decreases with the embodiment of the plastic bobbin (FIG. 6B) and increases with the stressed skin bobbin embodiment of the present invention (FIG. 6D). There is also an increased bending mode with respect to the Heath embodiment, but this is believed to be largely due to the fact that the total thickness of the coil-holding structure is increased as compared to the embodiment of FIG. 6D. It is believed that if the total height of the Heath embodiment was made the same as the other embodiments in this simulation, its bending frequency would be reduced.

Both the embodiment of the present invention and the Heath embodiment show increase in the coil torsion mode. As long as this value is relatively high compared to the bending mode, which it is in the case of the present invention, there should be minimal torsion-related post seek oscillation problems.

Inertia is increased with respect to all three embodiments of FIGS. 6B-6D relative to the baseline embodiment of FIG. 6A. The Heath embodiment shows the largest inertia increase. This data indicates that the stressed skins of the present invention, if made, for example, of glass having a thickness of 4 mils, would increase inertia only about two-thirds of the value shown but still provide sufficient stiffness. In the preferred embodiment of the present invention, the inertia increase would be minimized.

Figure 7:
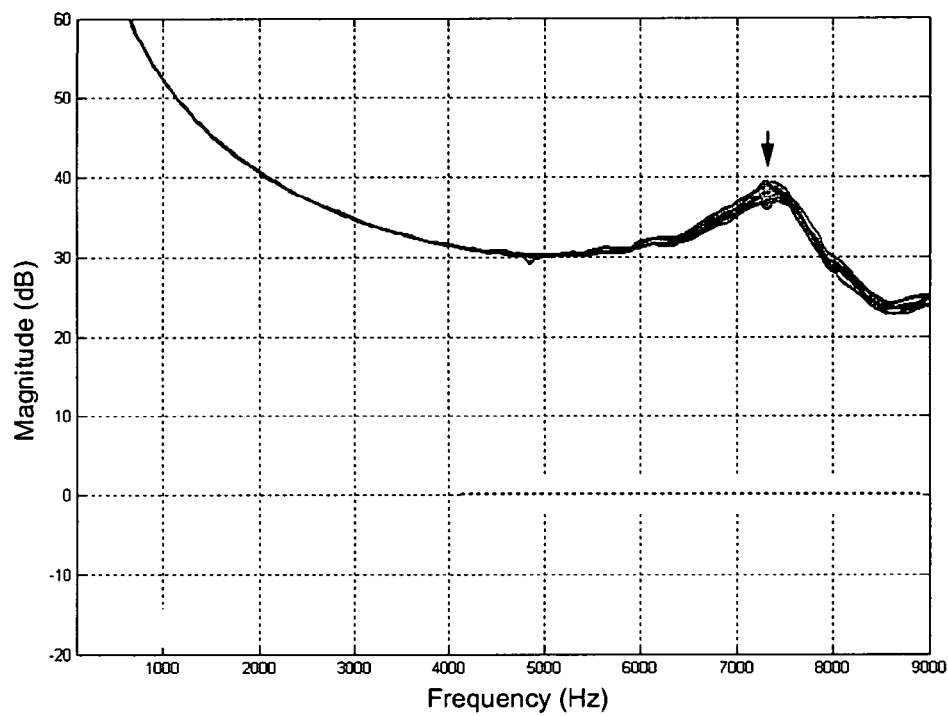
FIG. 7 is a graph showing the sway mode of an actuator assembly with four heads that does not employ a bobbin.
Figure 8:
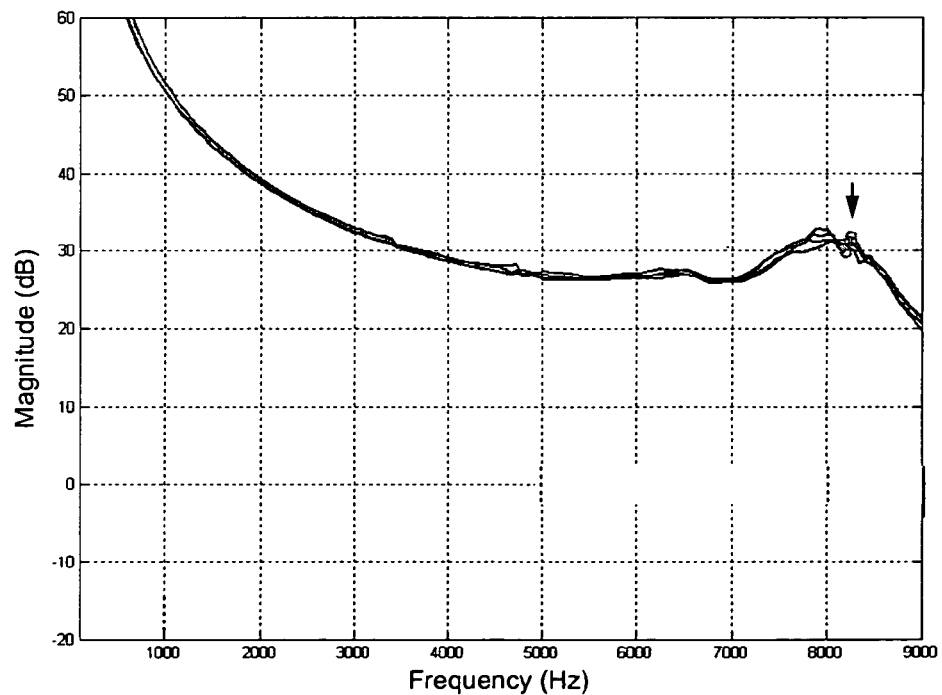
FIG. 8 is a graph showing the sway mode of an actuator assembly with four heads that employs glass stressed skins of the present invention.

Referring to FIGS. 7 and 8, an actual experiment was also conducted in a disk drive on an E-block actuator assembly containing a coil with no bobbin and a coil having a pair of stressed skins of the type shown in FIG. 5A. Measurements of coil sway, first bending mode and first torsion mode were made by focusing a Laser Doppler Vibrometer on one coil holder arm while pinging the other coil holder arm. The E-block core was clamped in a vise. The coil was struck and measured in-plane for the sway mode, and out-of-plane for the bending and torsion modes. The stressed skin bobbin was made of 0.004 inch thick aluminum sheets, top and bottom. The perimeter of the aluminum sheet was glued to the coil with a quick action epoxy. The void between the skins was not filled. The results of this experiment are shown in Table 3, below.

TABLE 3

Natural Frequencies (Hz)

|  | No Bobbin | Stressed Skin Bobbin |
|---|---|---|
| Sway | 5780 | 8081 |
| Bending | 1280 | 1263 |
| Torsion | 2175 | 2556 |

In general, the results show an approximate 40% improvement in the sway mode for the stressed skin embodiment relative to the no bobbin case FIG. 7 shows the magnitude and frequency of the resonance condition that manifests in the sway mode. This type of figure is generally referred to as the magnitude portion of the bode plot. Here, the four heads of the actuator assembly exhibit significant sway mode (system mode) displacements at about 7400 Hz at a magnitude of about 39 dB. However, as shown in FIG. 8, when a glass stressed skin is integrated into the voice coil, the sway mode is shifted to about 8300 Hz at a magnitude of 32 dB. The system mode frequencies were determined by the 90 degree phase shift between the command signal and the head displacement. The shift in sway mode increases the ability of the servo control system to accommodate and correct for position errors due to off track forces.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

While various embodiment of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. A method comprising:
    obtaining a support member having a first planar support member surface and an opposing second planar support member surface defining a support member thickness there between;
    attaching a voice coil to the support member, the voice coil formed by a plurality of wire windings, wherein an outermost winding and an opposing outermost winding define a voice coil thickness there between; and
    attaching a stiffener directly to the support member, wherein the stiffener has a first planar stiffener surface and an opposing second planar stiffener surface defining a stiffener thickness there between, wherein the combined thickness of the voice coil thickness and the stiffener thickness is no greater than the support member thickness.

2. The method of claim 1, wherein attaching the stiffener comprises attaching the stiffener such that first planar stiffener surface is substantially coplanar with one of the planar support member surfaces.

3. The method of claim 1, wherein the stiffener is a first stiffener, further comprising:
    attaching a second stiffener to at least one of the voice coil and the support member, wherein the second stiffener has a first planar second stiffener surface and an opposing second planar second stiffener surface defining a second stiffener thickness there between, wherein the combined thickness of the voice coil thickness, the first stiffener thickness and the second stiffener thickness is no greater than the support member thickness.

4. The method of claim 3, wherein attaching the second stiffener to at least one of the voice coil and the support member includes attaching the second stiffener such that the second stiffener is spatially disposed from and substantially parallel to the first stiffener.

5. The method of claim 3,
    wherein attaching the first stiffener comprises attaching the first stiffener such that the first planar stiffener surface is substantially coplanar with the first planar support member surface, and
    wherein attaching the second stiffener comprises attaching the second stiffener such that the first planar second stiffener surface is substantially coplanar with the opposing second planar support member surface.

6. The method of claim 3, further comprising disposing a damping material between the first stiffener and the second stiffener.

7. The method of claim 1, further comprising attaching the stiffener directly to the voice coil.

8. An apparatus comprising:
a support member having a first planar support member surface and an opposing second planar support member surface defining a support member thickness there between;
a voice coil attached to the support member, the voice coil formed by a plurality of wire windings, wherein an outermost winding and an opposing outermost winding define a voice coil thickness there between; and
a stiffener directly attached to the support member, wherein the stiffener has a first planar stiffener surface and an opposing second planar stiffener surface defining a stiffener thickness there between, wherein the combined thickness of the voice coil thickness and the stiffener thickness is no greater than the support member thickness.

9. The apparatus of claim 8, wherein the stiffener is a first stiffener, further comprising a second stiffener attached to at least one of the voice coil and the support member, wherein the second stiffener has a first planar second stiffener surface and an opposing second planar second stiffener surface defining a second stiffener thickness there between, wherein the combined thickness of the voice coil thickness, the first stiffener thickness and the second stiffener thickness is no greater than the support member thickness.

10. The apparatus of claim 9, further comprising a damping material disposed between the first and second stiffeners.

11. The apparatus of claim 8, wherein the voice coil comprises:
a first coil portion; and
a second coil portion, wherein the first and second coil portions are interconnected.

12. The apparatus of claim 11, wherein the stiffener is disposed between the first and second coil portions.

13. The apparatus of claim 11, wherein the first and second coil portions cooperatively define a recess sized to receivingly engage the stiffener.

14. The apparatus-of claim 11, further comprising a plurality of stiffeners including the stiffener,
wherein the voice coil comprises a set of coil portions including the first and second coil portions,
wherein the coil portions in the set of coil potions cooperatively define a plurality of recesses each sized to receivingly engage one of the plurality of stiffeners.

15. The apparatus of claim 8, wherein a first width of the voice coil transverse to the voice coil thickness is less than a second width of the voice coil transverse to the coil thickness.

16. The apparatus of claim 15, wherein the stiffener is attached to the voice coil proximate a portion of the voice coil having corresponding to the first width of the voice coil.

17. The apparatus of claim 8, wherein the first planar support member surface is substantially coplanar with an outermost surface of the outermost winding of the voice coil.

18. The apparatus of claim 8, wherein the stiffener is a first stiffener, further comprising a second stiffener spatially disposed from and substantially parallel to the first stiffener.

19. The apparatus of claim 18, wherein the first planar stiffener surface is substantially coplanar with the first planar support member surface, and
wherein the second stiffener has a planar second stiffener surface that is substantially coplanar with the opposing second planar support member surface.

20. The apparatus of claim 18, further comprising:
a damping material disposed between the first stiffener and the second stiffener.

21. The apparatus of claim 18, further comprising a damping material disposed between the first stiffener and the second stiffener, wherein the damping material is composed of at least one of a group consisting of:
foam;
an aero gel;
a composite material;
a plastic material; and
glass.

22. The apparatus of claim 18, further comprising a damping material disposed between the first stiffener and the second stiffener, wherein the damping material is cellular.

23. The apparatus of claim 18, further comprising a damping material disposed between the first stiffener and the second stiffener, wherein the damping material is a cellular foam.

24. The apparatus of claim 8, wherein the stiffener is constructed substantially from material selected from a group consisting of:
a glass;
a composite material; and
a ceramic material.

25. The apparatus of claim 8, wherein the stiffener is directly attached to the voice coil.

26. The apparatus of claim 8,
wherein the stiffener is a first stiffener, wherein the first planar stiffener surface is a first planar first stiffener surface, wherein the second planar stiffener surface is a second planar first stiffener surface,
the apparatus further comprising a second stiffener, wherein the second stiffener has a first planar second stiffener surface and an opposing second planar second stiffener surface defining a second stiffener thickness there between,
wherein the first stiffener is directly attached to both the voice coil and the support member,
wherein the second stiffener is directly attached to both the voice coil and the support member,
wherein the combined thickness of the voice coil thickness, the first stiffener thickness and the second stiffener thickness is no greater than the support member thickness,
wherein the first planar first stiffener surface is substantially coplanar with the first planar support member surface, and
wherein the first planar second stiffener surface is substantially coplanar with the opposing second planar support member surface.

27. A data storage device comprising:
an actuator that is moveable in a data transfer relationship with a media, the actuator including a support member supporting a coil, the support member having a first planar support member surface and an opposing second planar support member surface defining a support member thickness there between; and
means for attenuating a resonant response of the actuator, wherein a combined thickness of the means for attenuating a resonant response of the actuator and the coil is no greater than the support member thickness, wherein the means for attenuating a resonant response of the actuator is directly attached to the support member.

* * * * *